UNITED STATES PATENT OFFICE.

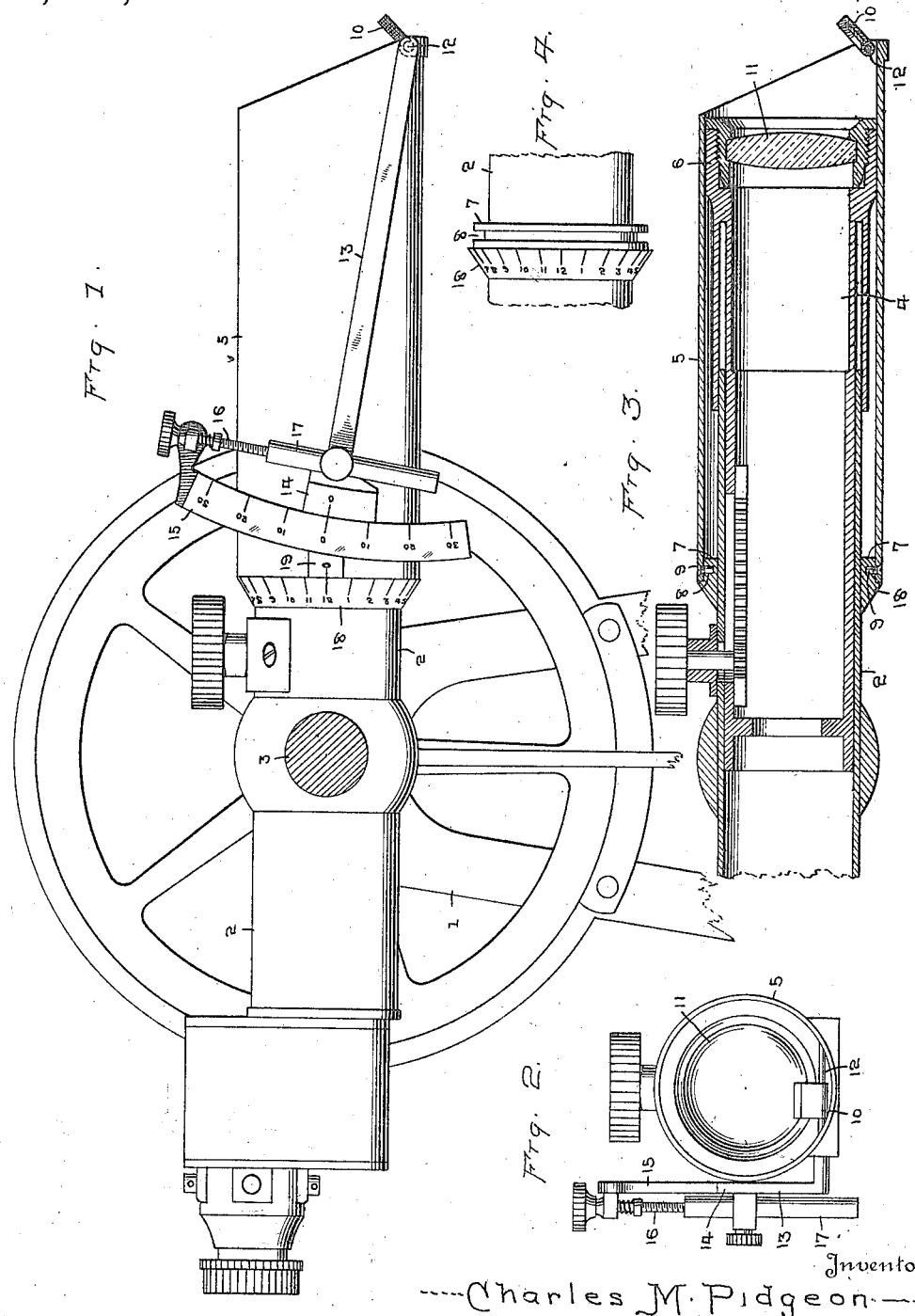

CHARLES M. PIDGEON, OF WASHINGTON, DISTRICT OF COLUMBIA.

ATTACHMENT FOR ENGINEERS' TRANSITS.

1,208,639. Specification of Letters Patent. Patented Dec. 12, 1916.

Application filed February 23, 1915. Serial No. 10,038.

*To all whom it may concern:*

Be it known that I, CHARLES M. PIDGEON, a citizen of the United States, residing at Washington, District of Columbia, have invented certain new and useful Improvements in Attachments for Engineers' Transits; and I do hereby declare the following to be a full, clear, and exact description of the invention, such as will enable others skilled in the art to which it appertains to make and use the same.

My invention relates to new and useful improvements in attachments for engineers' transits, alidades and other engineering and surveying instruments having a telescopic line of sight, and my prime object is to provide means for mechanically determining and locating a meridian line by observation on the sun.

A further object is to so construct the device that it will readily fit over the portion of the telescope carrying the objective lens.

A further object is to so construct and position the reflector that it will not interfere with the use of the telescope for other purposes. And a further object is to so construct the attachment that it can be readily applied to use without materially adding to the weight of the instrument and one that will dispense with the usual form of auxiliary telescopes or other added means for observing the sun.

Other objects and advantages will be hereinafter set forth and more particularly pointed out in the accompanying specification.

In the accompanying drawings which are made a part of this application, Figure 1 is a detailed elevation partly in section of an engineer's transit, showing my improved device attached thereto. Fig. 2 is an end elevation of the telescope, showing the attachment thereon. Fig. 3 is a central longitudinal sectional view through the telescope and attachment, and Fig. 4 is a detailed elevation of a portion of the telescope, showing the manner of securing the attachment thereto.

Referring to the drawings in which similar reference numerals designate corresponding parts throughout the several views, 1 indicates a portion of the frame of a transit, which is constructed in the usual or any preferred manner, and 2 indicates the usual form of telescope used in connection with the transit, said telescope having a pivotal connection 3 with the frame so that the objective end 4 of the telescope may be raised or lowered as desired.

To determine a meridian by observation on the sun, it has been customary heretofore to provide auxiliary telescopes and other devices in connection with the main telescopes for observing the sun, thus greatly encumbering the instrument as well as adding weight thereto, and a multiplicity of adjusting parts, therefore I have conceived a means of greatly simplifying the instrument as well as accomplishing the desired result with the employment of fewer parts and attaching said parts directly to the telescope of the instrument. To this end I provide a tubular sleeve 5 which extends over the movable objective end 4 of the main telescope, the outer end of the sleeve finding a bearing upon the collar 6 at the outer end of the telescope, while the inner end of the sleeve finds a bearing upon the circumferential rib 7 on the stationary portion of the telescope, said rib having a circumferential groove 8 into which are introduced the inner ends of screw or lugs 9 carried by the inner end of the sleeve 5, and by means of which the sleeve is held in engagement with the telescope and permitted to rotate thereon.

The length of the sleeve is such that when the objective end 4 of the telescope is extended its full distance, the end of the sleeve is projected a short distance beyond the objective end and said projecting end has pivotally mounted therein a reflector 10 which is adapted to direct the sun's rays through the objective lens 11 and into the telescope, said reflector being mounted upon a rod 12 which extends through the wall of the sleeve and is attached to a declination arm 13 and by means of which the reflector is swung in the arc of a circle in order to bring the sun's rays to the center of the field of the telescope.

The reflector 10 is small, and is positioned near the edge or perimeter of the sleeve so as to be out of the line of vision of the telescope, so that the telescope may be used for other purposes without interference from the reflector. From the point at which the reflector is pivotally mounted upon the sleeve, the end of the sleeve is cut at an angle of substantially 25°, so that the sun's rays will always strike the reflector even when turned to the extreme north declination.

The declination arm 13 has a graduated head or vernier 14, which coöperates with a graduated declination arc 15 to position the reflector so that when the telescope is in the meridian and plunged to the latitude of the place, the image of the sun will be reflected in the center of the field of the telescope. One end of the arc 15 has attached thereto an adjusting screw 16, which coöperates with a threaded sleeve 17 carried by the declination arm 13 so that said arm may be held in adjustment with respect to the declination arc. In order to readily find the sun, one face of the rib 7 is provided with graduations to form an hour arc or circle 18, with which coöperates a graduated index 19 on the sleeve 5, so that by ascertaining the time and rotating the sleeve until the index graduation registers with the proper hour graduations, the reflector will be positioned for bringing the image of the sun into the field of the telescope when the telescope is swung onto a meridian and plunged to the latitude of the place.

In operation, the latitude of the place or observer is set off on arcs provided on the transit, to bring the line of collimation of the telescope in the axis of the earth, when the declination of the sun is set off on the declination arc 15 through the medium of the declination arm 13, thus so positioning the reflector that when the transit is oriented on its pivots the reflected image of the sun will fall in the center of the field of the telescope thus establishing the meridian line. Simultaneously with the movement of the transit, the sleeve 5 is revolved about the telescope to bring the index 19 to the proper position with relation to the hour arc 18 to indicate the proper time, thus properly centering the image of the sun with respect to the field of the telescope.

When the parts are operated as above described, the meridian may be immediately and mechanically determined without the necessity of calculating to obtain the proper result.

By attaching the sleeve as shown, the same telescope is used in determining the declination of the sun as is used for obtaining the latitude and various other purposes, and by arranging the reflector in the manner shown, the telescope may be freely used without the reflector interfering with the line of vision. It will likewise be seen that by placing the sleeve around the end of the main telescope that all auxiliary telescopes or other attachments and their adjusting mechanisms are dispensed with, simplifying the instrument as well as reducing the cost and weight thereof. And furthermore by attaching the sleeve in the manner shown, said sleeve may be freely rotated independently of the telescope to which it is attached, thus reducing the number of parts employed for the various adjustments required in the other forms of telescopes constructed for this purpose.

What I claim is:—

1. The combination with the objective end of a telescope, of means mounted thereon to one side of the optical axis thereof and capable of adjustment in accordance with the time of day and the position of the sun for projecting the image of the sun in the center line of the field of the telescope.

2. The combination with the objective end of a telescope, of a sleeve mounted on said telescope and independently rotatable thereon, a reflector upon the free end of said sleeve, and means for adjusting the position of the reflector in accordance with the time of day and the position of the sun.

3. The combination with a telescope, of a transit or other surveying instrument, having a circumferentially grooved rib, of a sleeve adapted to fit over the objective end of said telescope, means carried by the sleeve engaging said groove to hold the sleeve over said telescope, a reflector mounted at the free end of the sleeve, and means to adjust said reflector in accordance with the time of day and the position of the sun whereby the image of the sun will be reflected in the center of the field of the telescope.

4. The combination with a transit telescope, having a grooved rib adjacent its pivot point, and a collar at its outer end, one edge of said rib having hour graduations thereon, of a sleeve adapted to fit over the objective end of the telescope and having its ends bearing respectively upon said rib and collar, means carried by the sleeve adapted to engage said groove in the rib and hold said sleeve over the telescope and permit the same to rotate independently of the telescope, one end of the sleeve having a graduated index to coöperate with the hour graduations, a reflector pivoted in the free end of said sleeve, means to adjust said reflector in accordance with the time of day and the position of the sun to reflect the image of the sun in the center of the field of the telescope, said reflector being positioned to one side of the center of the field of the telescope.

5. The combination with a transit telescope, of a sleeve independently rotatably mounted upon one end of the telescope, said sleeve having one of its ends projecting beyond the object end of the telescope, said end being cut at an angle to the axis of the sleeve, a reflector mounted in said projecting end, and means to adjust said sleeve and reflector in accordance with the time of day and the position of the sun to reflect the image of the sun in the center of the field of the telescope.

6. The combination with an instrument having a telescopic line of sight, of a sleeve projecting beyond the objective end of said instrument, said projecting end being cut at an angle to the axis of the sleeve, means to rotatably attach the sleeve to said instrument, a reflector pivotally mounted in the projecting portion of said sleeve, and means to adjust said reflector in accordance with the time of day and the position of the sun to reflect the image of the sun into the center of the field of the instrument.

In testimony whereof I have signed my name to this specification in the presence of two subscribing witnesses.

CHARLES M. PIDGEON.

Witnesses:
D. W. GILL,
MARK M. KELLEY.

Copies of this patent may be obtained for five cents each, by addressing the "Commissioner of Patents Washington, D. C."